United States Patent [19]

Hager et al.

[11] Patent Number: 4,494,003
[45] Date of Patent: Jan. 15, 1985

[54] METHOD OF DETECTING GAMMA RADIATION BY PLACING GLASS DOPED WITH IRON IN AN ENVIRONMENT SUBJECT TO GAMMA RADIATION AND THEN MEASURING ANY COLOR CHANGED IN THE DOPED GLASS AS A FUNCTION OF GAMMA RADIATION

[75] Inventors: Adolph G. Hager, Pt. Pleasant; Gerald L. Freeman, Freehold Township, Monmouth County; James P. Rush, Union; Louis E. Branovich, Howell; Stanley DuBuske, Lincroft, all of N.J.

[73] Assignee: The United States of America as represented by the Secretary of the Army, Washington, D.C.

[21] Appl. No.: 472,441

[22] Filed: Mar. 7, 1983

[51] Int. Cl.³ .................................................. G01T 1/06
[52] U.S. Cl. ................................. 250/474.1; 250/473.1
[58] Field of Search .......................... 250/474.1, 473.1; 252/600; 356/432, 425

[56] References Cited

U.S. PATENT DOCUMENTS

| | | | |
|---|---|---|---|
| 3,046,400 | 7/1962 | Paymal | 250/473.1 |
| 4,019,372 | 4/1977 | Parkell et al. | 73/61.1 C |
| 4,236,826 | 12/1980 | Yamanishi | 356/432 |
| 4,454,421 | 6/1984 | Tanaka et al. | 250/336.1 |

Primary Examiner—Janice A. Howell
Assistant Examiner—Constantine Hannaher
Attorney, Agent, or Firm—Anthony T. Lane; Jeremiah G. Murray; Roy E. Gordon

[57] ABSTRACT

Gamma radiation is detected by placing iron doped glass in an environment subject to gamma radiation and then measuring any color change in the doped glass as a function of gamma radiation.

2 Claims, No Drawings

METHOD OF DETECTING GAMMA RADIATION BY PLACING GLASS DOPED WITH IRON IN AN ENVIRONMENT SUBJECT TO GAMMA RADIATION AND THEN MEASURING ANY COLOR CHANGED IN THE DOPED GLASS AS A FUNCTION OF GAMMA RADIATION

The invention described herein maybe manufactured, used, and licensed by or for the Government for governmental purposes without the payment to us of any royalty thereon.

This invention relates to a method of detecting gamma radiation.

BACKGROUND OF THE INVENTION

Gamma radiation is electromagnetic radiation similar to x-rays except that gamma rays originate in the nucleus of an atom whereas x-rays originate in the extranuclear structure. Gamma rays usually have higher energies and correspondingly shorter wavelengths than x-rays. Gamma radiation is highly penetrating and usually accompanies alpha and beta emissions and always accompanies fission.

Present day dosimeters to detect and measure gamma radiation such as geiger counters and solid state detectors require complicated circuitry and mechanical manipulation to detect the presence of gamma radiation.

SUMMARY OF THE INVENTION

The general object of this invention is to provide a simple and economic method of detecting gamma radiation. A further object of the invention is to provide such a method that eliminates the need for dosimeters such as geiger counters and solid state detectors requiring complicated circuitry. A still further object of the invention is to provide such a method that can be used by untrained persons.

The foregoing objects have now been obtained by placing glass doped with iron or manganese in an environment subject to gamma radiation and then measuring any color change in the doped glass as a function of gamma radiation. The invention is based on the discovery that various glasses change colors when exposed to gamma radiation. More specifically, glass containing iron changes to greenish brown (olive) and glass containing manganese changes from clear to purple.

The type of glass used is not critical. That is, any type of glass can be doped with selected concentrations of manganese or iron.

For a given amount of gamma radiation, a glass doped with a lower concentration of manganese or iron will exhibit a smaller change in color. A glass doped with a higher concentration of manganese or iron will exhibit a larger change of color for the same amount of gamma radiation.

The amount of gamma radiation can be measured by means of a fixed, calibrated source of light as for example a flash lamp with a known spectrum of light. One then measures the attenuation of light transmitted through the gamma irradiated sample of glass as a function of gamma dosage or one can measure the amount of gamma radiation as a function of the change in the index of refraction of light transmitted through the gamma irradiated sample of glass.

The amount of gamma radiation detected by the glass can also be measured by comparison with a color chart. In the latter case even an untrained person can determine the amount of gamma radiation in a particular environment.

The method of the invention is further economic in that the gamma irradiated glass is regenerable; that is, it can be restored to its original clarity by the application of heat.

The sensitivity of the manganese or iron doped glass is a function of the concentration and the thickness of the glass. That is, the sensitivity can be expressed by Beers Law or $$\log (I_o/I) = KCL$$

wherein
$I_o$ is the initial light transmission,
$I$ is the light transmission of the manganese or iron doped glass after gamma irradiation,
$K$ is a constant,
$C$ is the concentration of the manganese or iron, and
$L$ is the length of path of light transmission The sensitivity is proportional to the concentration of manganese or iron in the glass.

The method of the invention has a cost advantage in that no electronics is involved. Moreover, the method is simple in that a piece of doped glass less than an inch square in area can be used. Then too, the method obviates any problem of mass production for civil defence and military needs. The method is simple to carry out and enables one to easily determine gamma radiation exposure. The method also can be used by the individual combat soldier.

DESCRIPTION OF THE PREFERRED EMBODIMENT

An array of manganese doped glass lenses in suitable holders are positioned in an area subject to gamma radiation. Each glass lens contains a different concentration of manganese dopant and a variable lens thickness. After high gamma radiation, the glass with the lower concentration of manganese dopant is seen to have the smaller change in color. The glass with the higher concentration of manganese dopant is seen to have the larger change of color for the same amount of gamma radiation.

The amount of gamma radiation can be measured by means of a fixed calibrated source of light as for example, a flash lamp with a known spectrum of light. One then measures the attenuation of light transmitted through the gamma irradiated sample as a function of gamma dosage or one can measure gamma radiation as a function of the change in the index of refraction of light transmitted through the gamma irradiated sample.

In the foregoing embodiment in lieu of an array of magnanese doped glass lenses in which each glass lens has a fixed manganese concentration and a variable lens thickness, one may use an array in which each glass lens has a variable manganese concentration and a fixed lens thickness.

EXAMPLE

A simple piece of glass is to be worn as a watch crystal or hung from ones clothing or hung in various rooms and buildings. The glass is 1 inch × 1 inch × 0.05 to 0.5 inch high. This glass contains manganese of various concentrations in the parts per million (ppm) region. Under gamma radiation, the glass undergoes a color change from clear to purple as a function of gamma. The intensity of the color range is a function of the concentration of manganese as well as the thickness of the glass. This color change is then calibrated to gamma radiation either by instrumentation or by comparison with a color chart.

We wish it to be understood that we do not desire to be limited to the exact details as described for obvious modifications will occur to a person skilled in the art.

What is claimed is:

1. Method of detecting gamma radiation comprising placing iron doped glass in an environment subject to gamma radiation and then measuring any color change in the doped glass as a function to gamma radiation.

2. Method according to claim 1 wherein any color change due to gamma radiation is restored to the original condition by the application of heat.